US006215506B1

(12) United States Patent
Makino et al.

(10) Patent No.: US 6,215,506 B1
(45) Date of Patent: Apr. 10, 2001

(54) PORTRAIT DRAWING APPARATUS

(75) Inventors: Satoru Makino; Yumiko Takeda; Mina Kawai, all of Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 08/069,365

(22) Filed: Jun. 1, 1993

(51) Int. Cl.$^7$ .............................. G06F 15/00; G06F 7/00

(52) U.S. Cl. ......................... 345/501; 345/521; 707/104

(58) Field of Search ................................ 395/150, 152, 395/155, 162–166, 135; 382/10, 16, 30, 48, 57; 345/501, 503, 507, 509, 516, 521; 707/104

(56) References Cited

U.S. PATENT DOCUMENTS

| | | | | |
|---|---|---|---|---|
| 4,926,344 | * | 5/1990 | Collins et al. | 395/62 |
| 5,057,019 | * | 10/1991 | Harvey | 434/155 |
| 5,111,409 | * | 5/1992 | Gasper et al. | 395/152 |
| 5,179,652 | * | 1/1993 | Rozmanith et al. | 395/155 |
| 5,212,769 | * | 5/1993 | Pong | 395/150 |
| 5,247,610 | * | 9/1993 | Oshima | 395/135 |
| 5,274,714 | * | 12/1993 | Hutcheson | 382/15 |
| 5,375,195 | * | 12/1994 | Johnston | 395/135 |
| 5,974,422 | * | 10/1999 | Kagami et al. | 707/104 |
| 6,094,658 | * | 7/2000 | Araki | 707/104 |

FOREIGN PATENT DOCUMENTS 4-208191    7/1992    (JP) .

OTHER PUBLICATIONS

Wu, J., Ang, Y., Lam, P., Moorthy, S., Narasimhalu, A., "Facial Image Retrieval, Identification, and Inference System", Proceedings of the First ACM International Conference on Multimedia, Aug. 1993, pp. 47–55.*
R. Curtis, S. Scarfone, "XFace, an X Tool for Presenting Multivariate Data, and its Use with Software Metrics", IPCCC '92 pp. 525–530.*
S. Morishima, H. Harashima, "Image Synthesis & Editing System for a Multi–Media Human Interface with Speaking Head", ICIP '92 pp 270–273.*
S. Morishima et al, "A Facial Image Synthesis System for Human–Machine Interface", IEEE, 1992, pp. 363–368.
A. Levi et al, "A New Approach to Face Composites Construction Superimposition of Whole Face Images", IEE, pp. 3/1–3/4.
"Name Land KL–1200" (Owner's Manual) manufactured by Casio 10/92.

* cited by examiner

Primary Examiner—Ulka J. Chauhan
(74) Attorney, Agent, or Firm—Oliff & Berridge, PLC

(57) ABSTRACT

A portrait drawing apparatus for storing for each facial part a plurality of attributes thereof (race, sex, age-group, specific shape such as snub or aquiline for nose, etc.) and for allowing the facial part candidates selected as per the designated attributes to be displayed preferentially over the candidates having other attributes so that the operator will determine the appropriate facial parts with ease and combine them into a portrait in the shortest possible time. The apparatus comprises an image display unit, an input unit and a memory unit that stores programs and data, i.e., a facial part attribute table, facial part pattern data and facial part candidate tables. The facial part attribute table includes pattern numbers, facial part patterns, attributes, and address pointers pointing to the facial part pattern data.

14 Claims, 8 Drawing Sheets

PORTRAIT DRAWING APPARATUS

BACKGROUND OF THE INVENTION

1. Field of the Invention

The present invention relates to a portrait drawing apparatus for allowing patterns of the eyes, nose and other facial parts to be selected and combined as desired in order to draw a portrait.

2. Description of the Related Art

Conventional portrait drawing apparatuses generally comprise a display unit that displays portrait image data, a memory unit that stores facial part pattern data, and an input unit used to determine the facial parts with which to draw a portrait. As shown in FIG. 7, the display unit comprises a display screen 81 having a facial part name display area 83 and a portrait drawing area 82. The facial part name display area 83 displays such facial part names 84 as the eyes, nose, mouth, eyebrows, ears, hair, facial contour, mustache, wrinkles and sideburns with which to construct a likeness. The portrait drawing area 82 is an area in which the operator draws a portrait using the facial parts whose names are listed in the area 83.

With the conventional portrait drawing apparatus, the operator selects appropriate facial parts from the facial part names 84 in the facial part name display area 83, and arranges suitably the selected facial parts in the portrait drawing area 82. More specifically, the operator first determines the facial part with which to construct the portrait (step 91 in FIG. 8). When the facial part (e.g., the nose) is selected, candidates of the selected facial part are displayed successively in the "nose" position of the portrait drawing area 82 in FIG. 7 (step 92)

The operator then selects one nose from among the candidates successively overwritten in the "nose" position of the portrait drawing area 82, the selected nose best representing the characteristic of the model's nose (steps 94 and 95).

With the nose thus selected and positioned, other facial parts still need to be selected (NO in step 96). Thus step 91 is reached again, and another facial part is selected (steps 92 through 95).

In this manner, the remaining facial parts are selected and positioned. When all facial parts have been selected (YES in step 96), the drawing of the portrait comes to an end.

One disadvantage of the prior art portrait drawing apparatus is this: because each facial part needs to be selected from all those previously stored candidates of the part, the candidates being displayed successively in a predetermined order, it takes time for the operator to select the most likely candidate. In addition, the operator must be fully cognizant of the model's facial characteristics in order to make suitable decisions on the facial part candidates displayed. The more facial parts to be determined, the more time required to draw the portrait.

SUMMARY OF THE INVENTION

It is therefore an object of the present invention to overcome the above and other deficiencies and disadvantages of the prior art and to provide a portrait drawing apparatus which stores for each facial part a plurality of attributes thereof (race, sex, age-group, specific shape such as snub or aquiline for nose, etc.) and allows the facial part candidates selected as per the designated attributes to be displayed preferentially over the candidates having other attributes so that the operator will determine the appropriate facial parts with ease and combine them into a portrait in the shortest possible time.

In carrying out the invention and according to one aspect thereof, there is provided a portrait drawing apparatus comprising: image display means for displaying portrait image data; storage means for storing pattern data on a plurality of facial parts; attribute storage means for storing information on the attributes corresponding to the facial part pattern data; input means for inputting attribute information as the condition under which to search for a facial part pattern; searching means for searching for the appropriate facial part pattern based on the attribute information derived from the attribute storage means; and display control means for displaying on the image display means the facial part pattern searched and retrieved by the searching means.

In operation, the input means first admits attribute information under which to search for each facial part. Given the attribute information input, the searching means searches for the target facial part pattern using the facial part pattern data from the storage means and the attribute information from the attribute storage means. Once the appropriate facial part pattern is searched and retrieved, that pattern is displayed on the image display means.

These and other objects, features and advantages of the invention will become more apparent upon a reading of the following description and appended drawings.

DESCRIPTION OF THE PREFERRED EMBODIMENT

Figure 1:
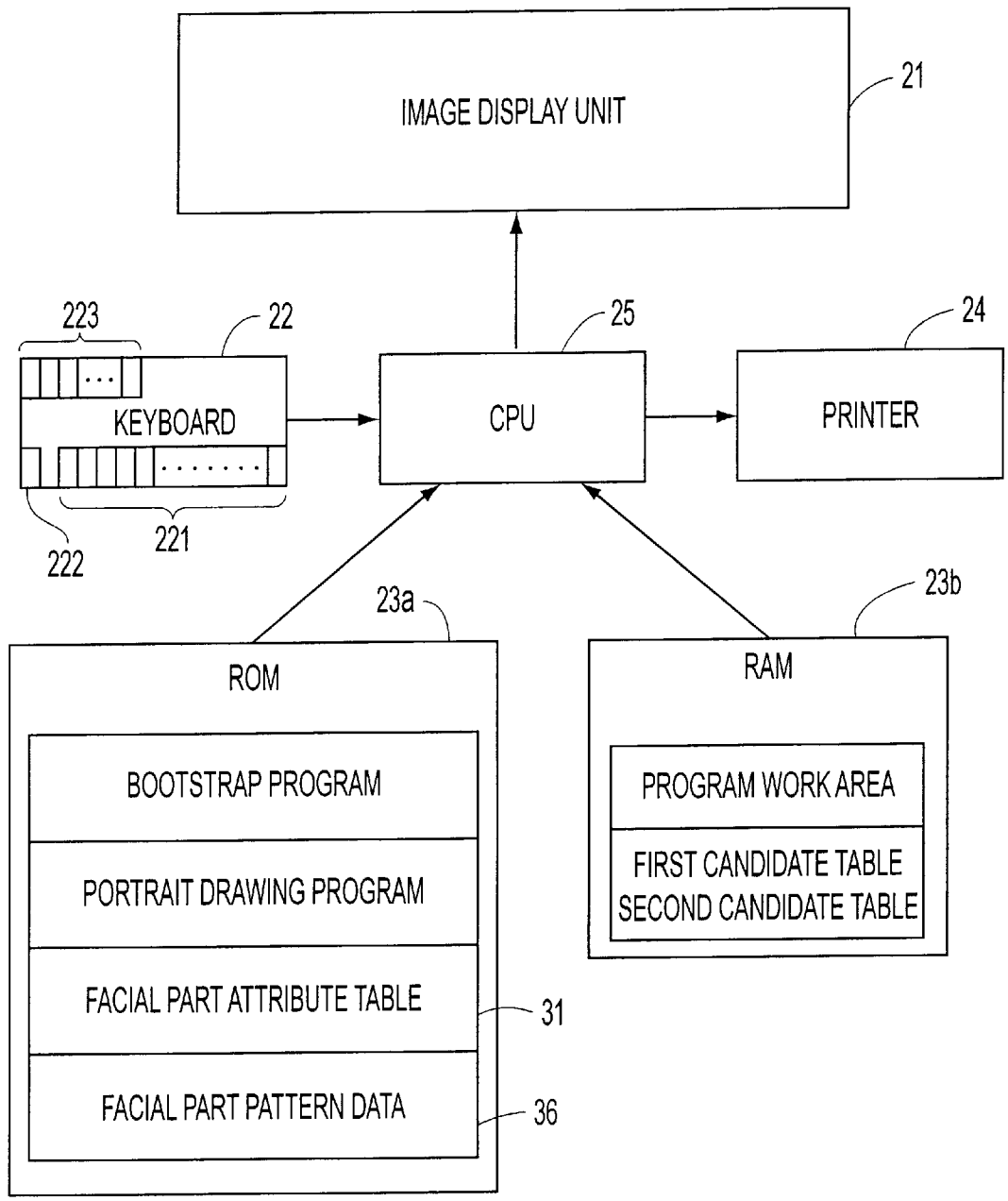
FIG. 1 is a block diagram of a portrait drawing apparatus embodying the invention.

One preferred embodiment of the invention will now be described with reference to the accompanying drawings. As shown in FIG. 1, the portrait drawing apparatus embodying the invention comprises an image display unit 21, a keyboard 22, a ROM 23a, a RAM 23b, a printer 24 and a CPU 25. The image display unit 21 is a display unit on which facial part candidates along with the part names are displayed and combined to form a portrait. The keyboard 22 is used to enter the key word with which to search for the facial part in question, and includes a plurality of character keys 221, a candidate key 222 and a plurality of function keys 223. The candidate key 222 is used to display the next facial part pattern candidate on the image display unit 21. The printer 24 prints the portrait thus drawn. The CPU 25 controls the operation of these components of the portrait drawing apparatus.

Figure 2:
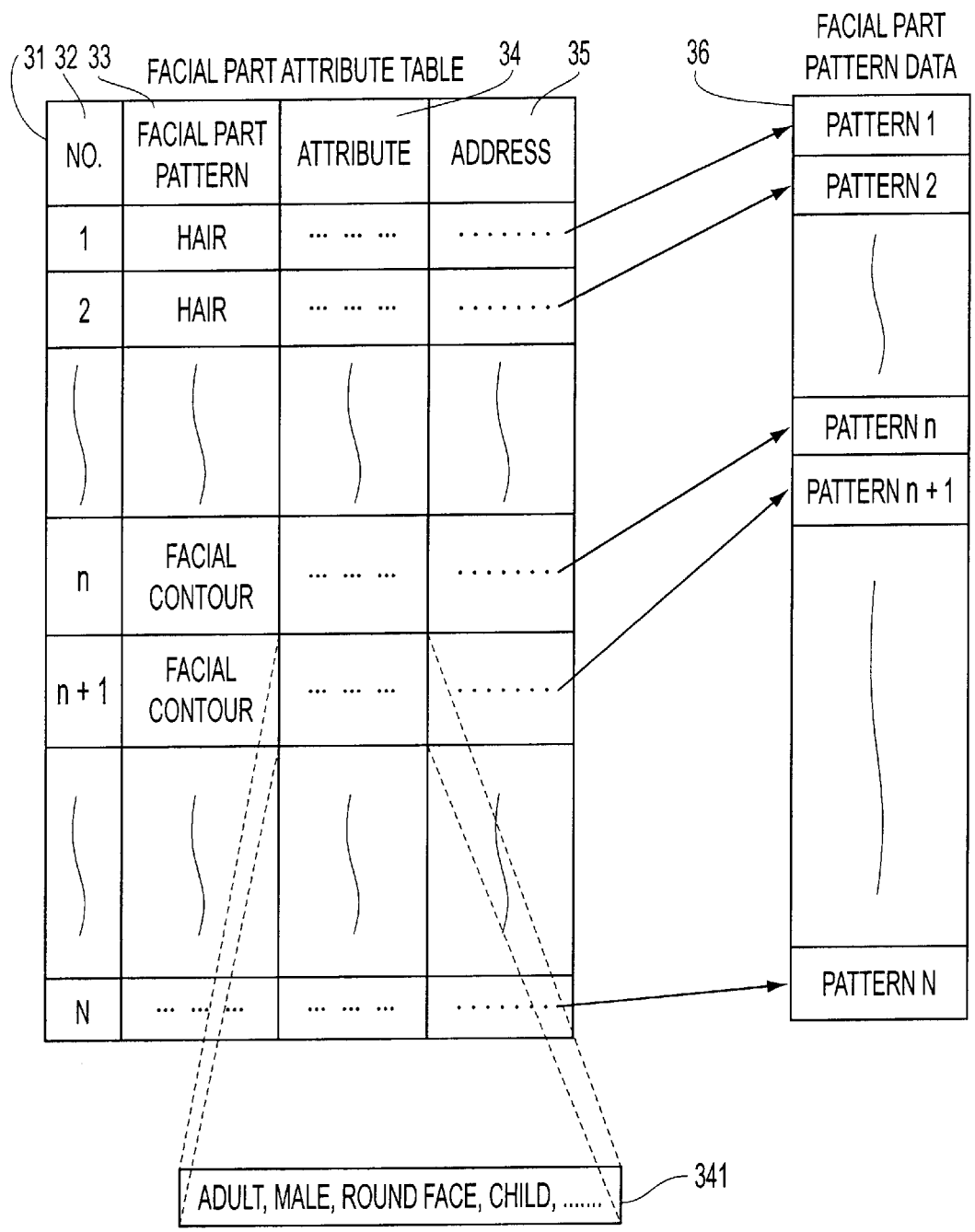
FIG. 2 is a view showing how a facial part attribute table is related to individual facial part patterns in the embodiment.
Figure 7:
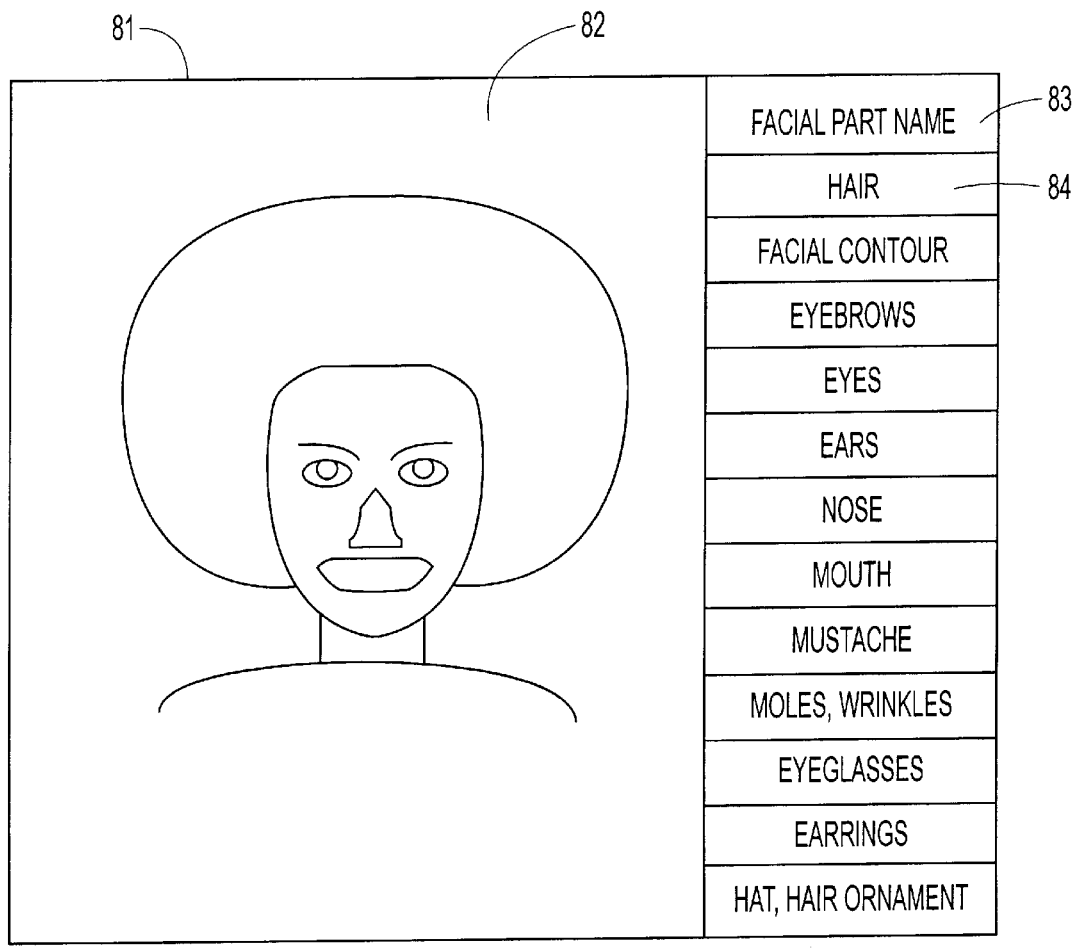
FIG. 7 is a typical screen of a portrait drawing apparatus.
Figure 8:
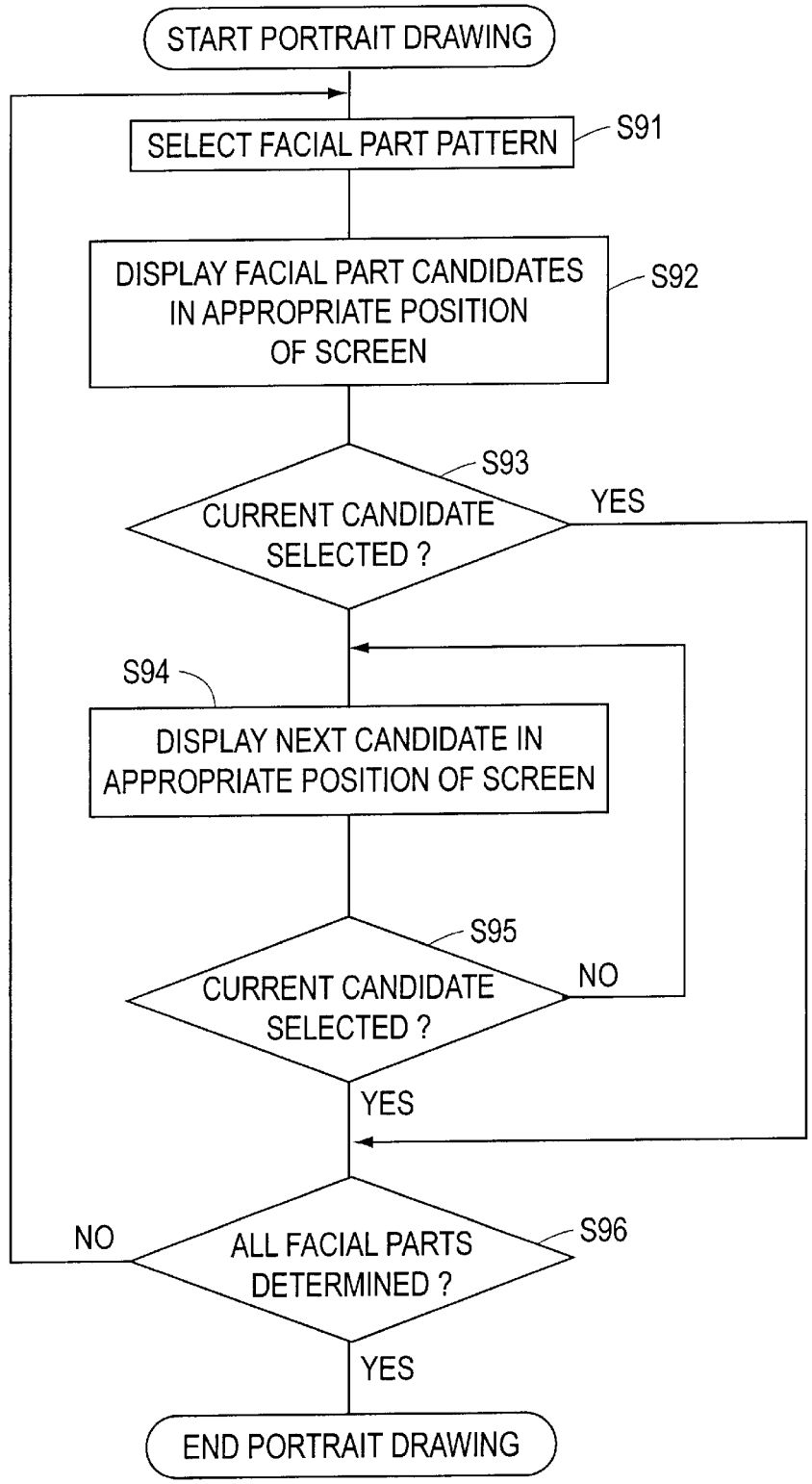
FIG. 8 is a flowchart of steps in which the typical prior art portrait drawing apparatus works.

As depicted in FIG. 7, the image display unit 21 includes a display screen 81 having a facial part name display area 83 and a portrait drawing area 82. The facial part name display area 83 displays such facial part names 84 as the eyes, nose, mouth, eyebrows, ears, hair, facial contour, mustache, wrinkles and sideburns with which to construct a likeness. The portrait drawing area 82 is an area in which to draw a portrait using the appropriate facial parts. The ROM 23a accommodates a bootstrap program, a portrait drawing program, a facial part attribute table and facial part pattern data. The RAM 23b stores a facial part candidate table area and a work area in which programs are run. As illustrated in FIG. 2, the facial part attribute table includes pattern numbers 32 by which to search through facial part candidates, facial part patterns 33, attributes 34 having attribute details 341, and address pointers 35 pointing to the facial part pattern data 36 representing the respective facial part patterns.

Figure 4:
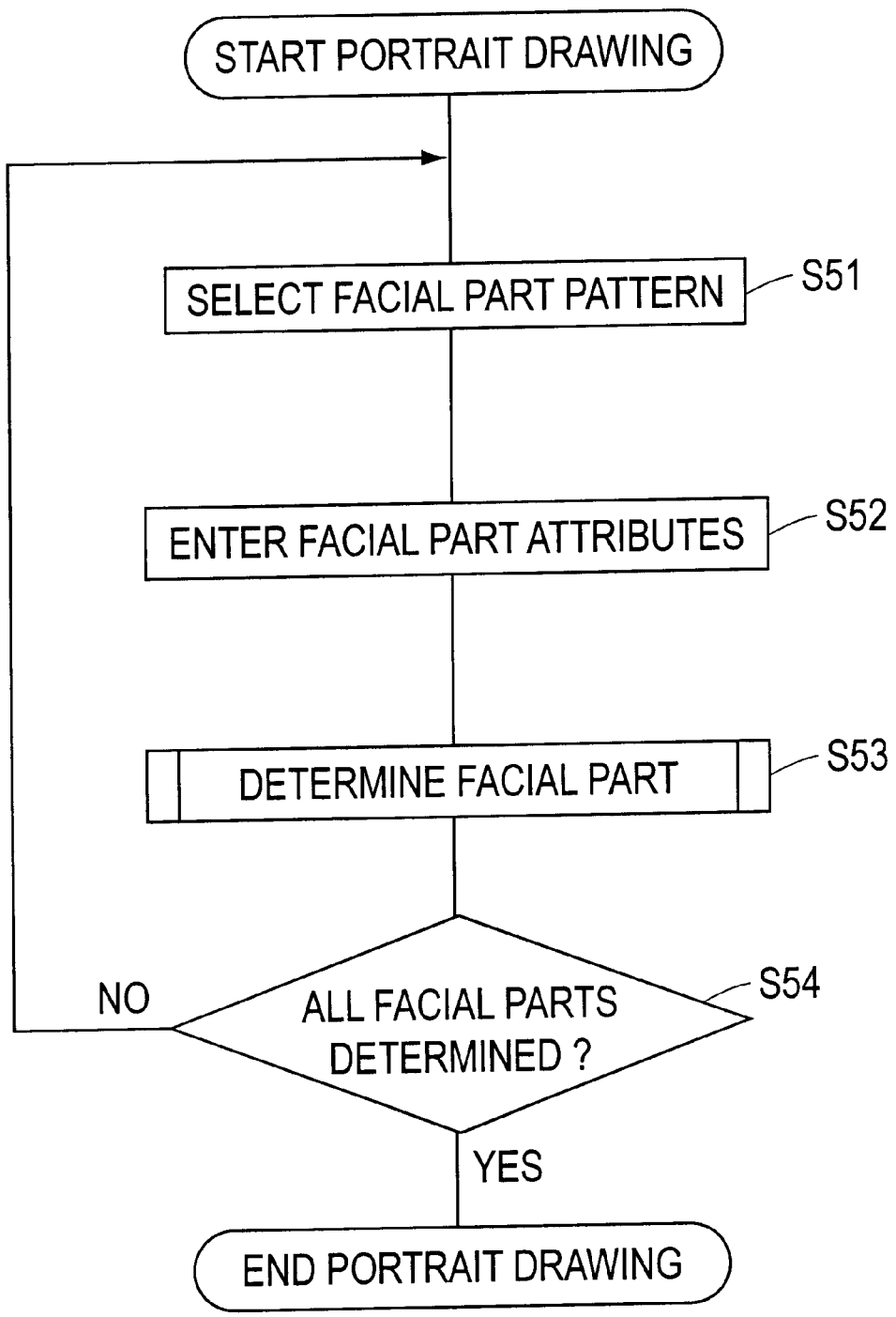
FIG. 4 is a flowchart of steps in which the embodiment works.

How the embodiment of the above constitution works will now be described with reference to the flowcharts of FIGS. 4, 5 and 6. Applying power to the embodiment activates the bootstrap program stored in the ROM 23a. The bootstrap program initializes the components and starts the portrait drawing program.

With the portrait drawing program started, the screen of FIG. 7 appears on the image display unit 21. The operator selects a desired facial part name 84 in the facial part name display area 83 using the keyboard 22 (step 51 in FIG. 4). When the facial part name is selected, the system prompts the operator to enter attributes regarding the facial part. If the selected facial part is, say, the facial contour, the operator enters illustratively "male" "female" "adult" "child" "round face" and other applicable attributes (step 52).

With the attributes entered, the facial pattern candidates are successively displayed in the "facial contour" position of the portrait drawing area 82 in accordance with the operation of the candidate key 222 by the operator, and one of the successively displayed facial pattern candidates is selected in a facial part determining routine (step 53). The selected facial pattern candidate is the one that best represents the characteristic of the person whose portrait is to be drawn. The above steps S51 and S52 are process for entering some information about the facial part patterns 33 and the attributes 34, and the facial part attribute table 31 is searched using the entered information to identify the facial pattern candidates. Therefore, the operator can enter the attributes (step 52) before selecting the facial parts (step 51).

If there remain other facial parts to be determined (NO in step 54), step 51 is reached again for another pass of selecting the next facial part (steps 52 and 53).

The facial parts are selected and determined in the manner described above. When all facial parts are dealt with (YES in step 54), the portrait is completed.

Figure 3:
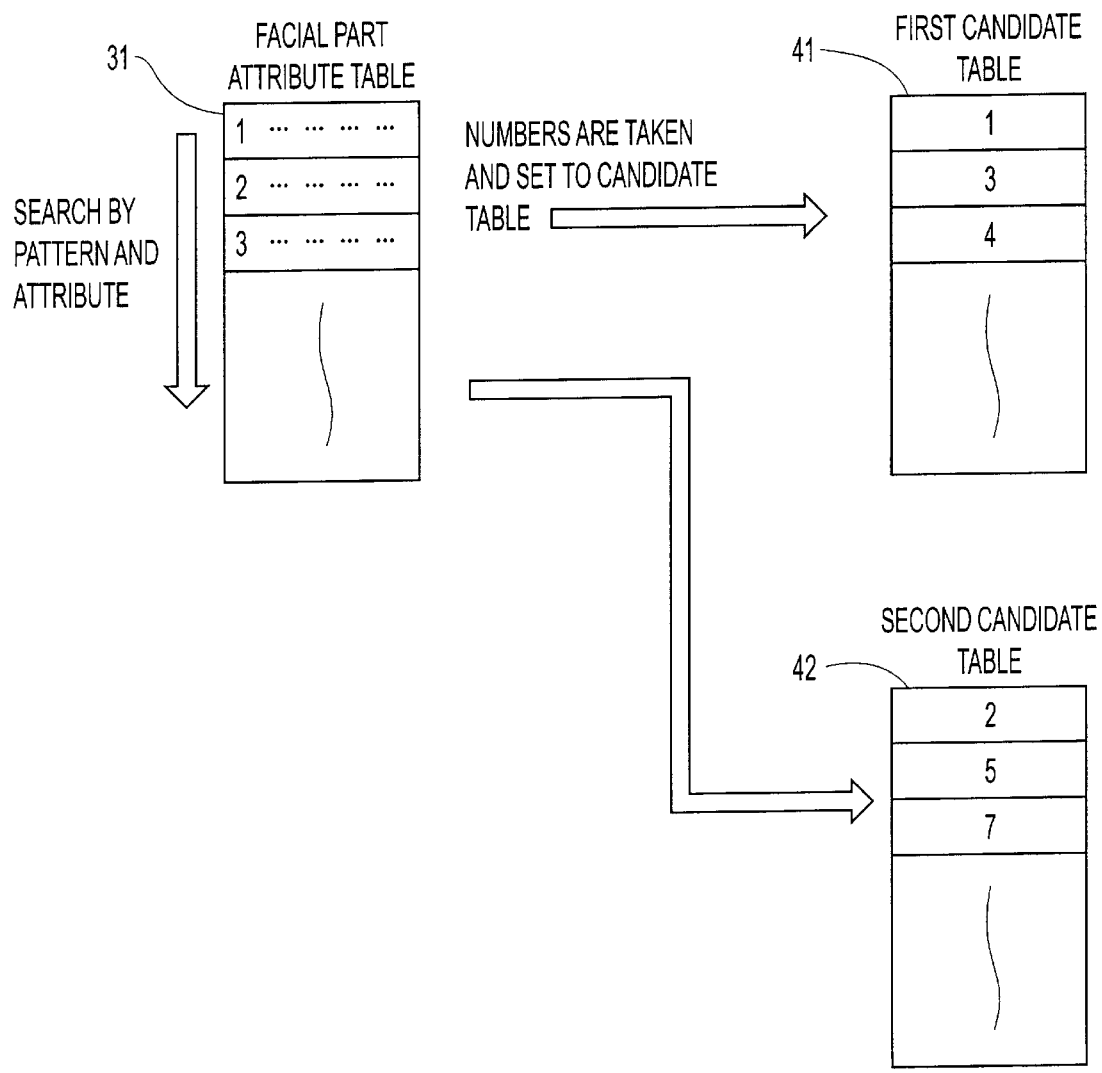
FIG. 3 is a view depicting how the facial part attribute table is related to candidate tables in the embodiment.
Figure 5:
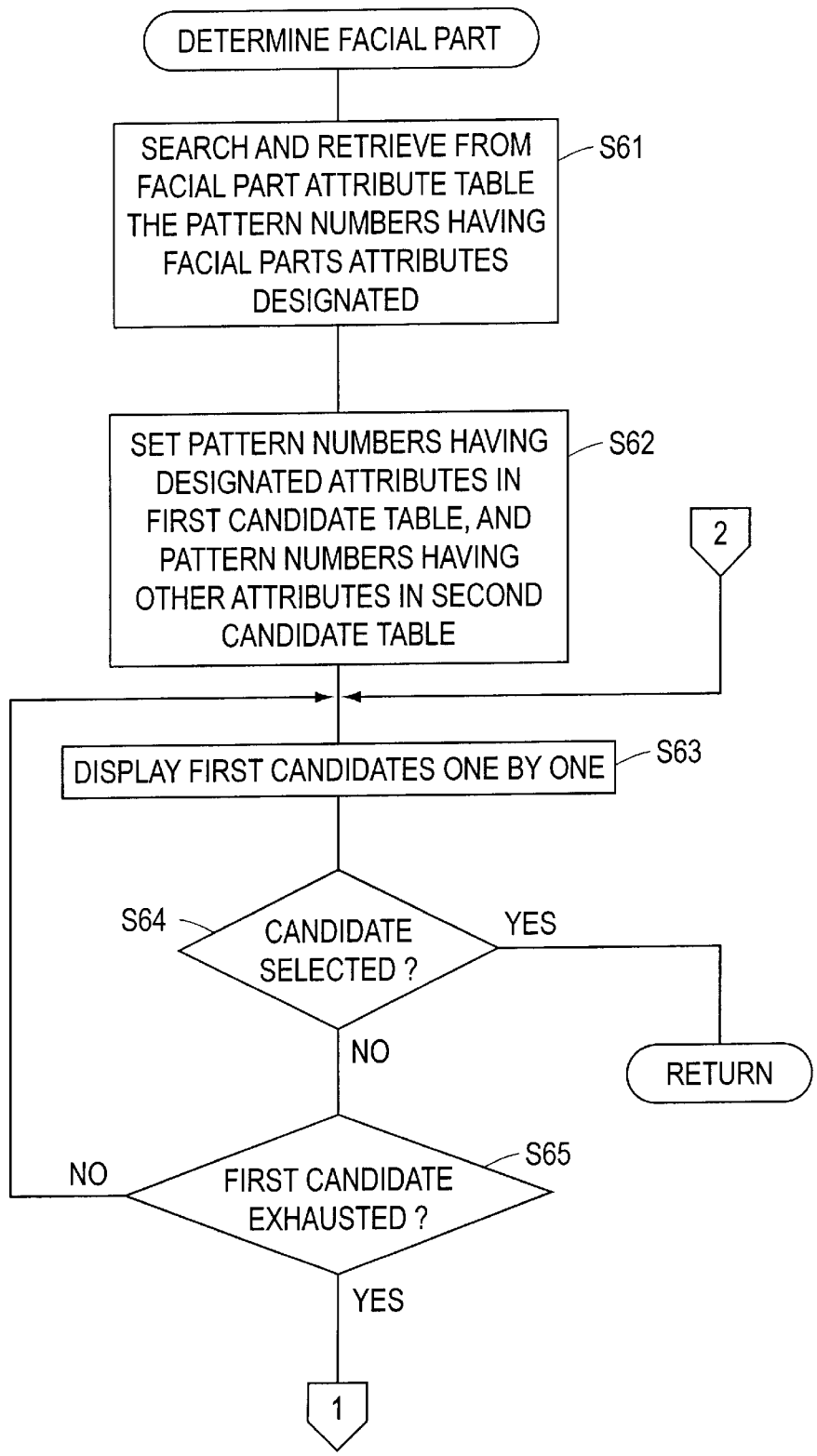
FIG. 5 is another flowchart of steps in which the embodiment works.
Figure 6:
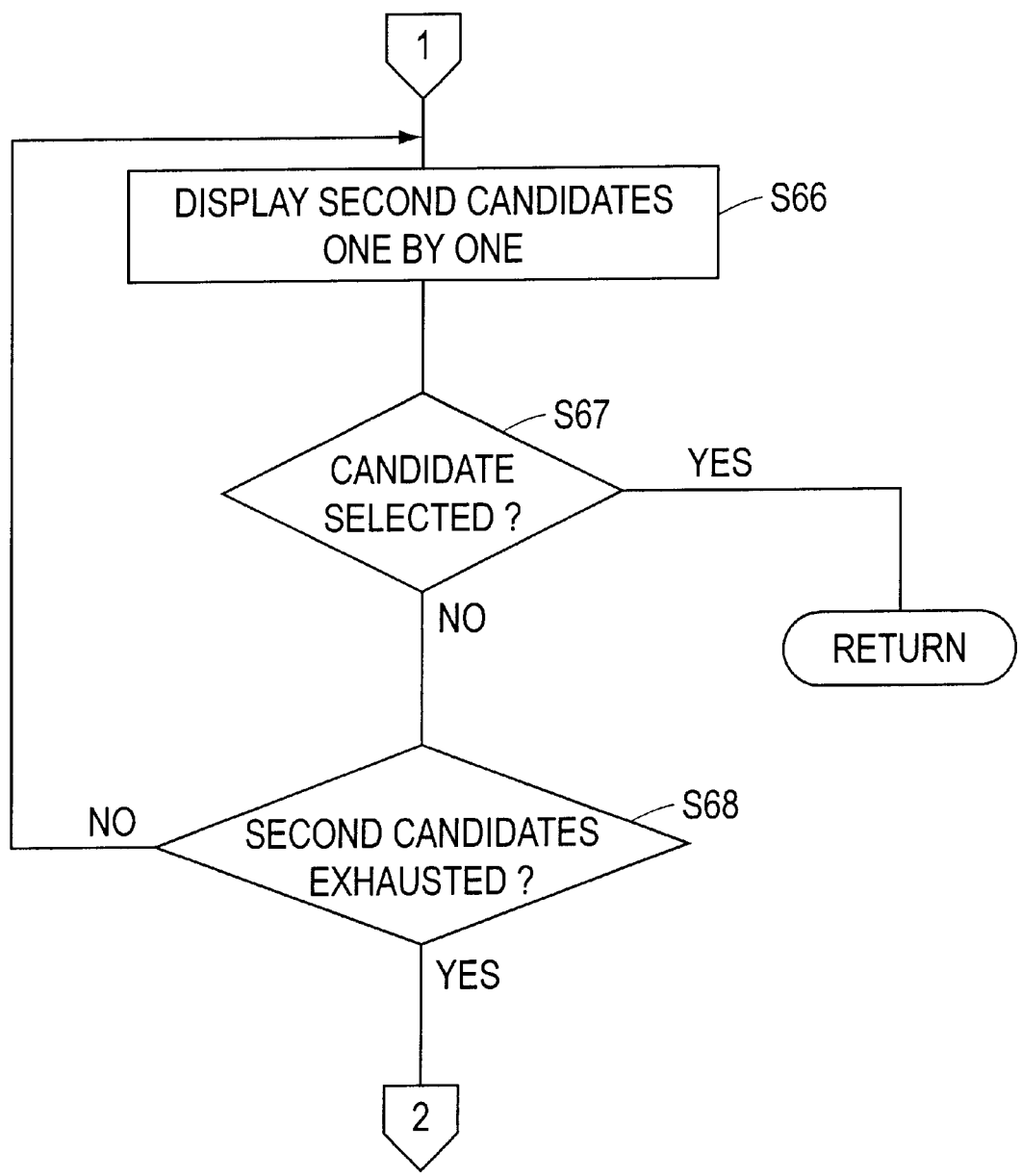
FIG. 6 is a further flowchart of steps in which the embodiment works.

More specifically, the above-mentioned facial part determining routine first searches and retrieves from the facial part attribute table 31 the pattern numbers 32 having the facial part attributes entered in step 52 (step 61 of FIG. 5). The pattern numbers 32 of the facial part having the required attributes are set successively in a first candidate table 41, and the pattern numbers 32 not corresponding to the required facial part attributes are set successively in a second candidate table 42 (step 62). The relation between the facial part attribute table 31 and the first and the second candidate tables 41 and 42 is shown in FIG. 3. When the pattern numbers 32 are thus set in the first and the second candidate tables 41 and 42, the pattern numbers 32 in the first candidate table 41 are used initially to reference the address pointers 35 in the facial part attribute table 31. In turn, the address pointers 35 point to the facial part patterns in the facial pattern data 36. The facial part patterns thus pointed to are displayed as facial part candidates in the portrait drawing area 82 (step 63).

The operator determines whether or not the currently displayed facial part candidate in the portrait drawing area 82 best represents the model's characteristic regarding the facial part in question, and operates the keyboard 22 to enter the decision (step 64). If the currently displayed candidate is deemed appropriate and selected (YES in step 64), control is returned from the facial part determining routine to step 54; if the currently displayed candidate is not selected (NO in step 64), a check is made to see if the current pattern number 32 in the first candidate table 41 is the last number (step 65). If the pattern number 32 is not the last number (NO in step 65), step 63 is reached again in which the facial pattern corresponding to the next pattern number 32 in the first candidate table 41 is displayed as another candidate in the portrait drawing area 82 (step 63).

The process of determining the facial part (steps 63 through 65) continues until the appropriate facial part candidate is selected (YES in step 64) or until the pattern numbers 32 stored in the first candidate cable 41 have been exhausted (YES in step 65). When the last pattern number 32 in the first candidate table 41 is displayed as a candidate (YES in step 65), the pattern numbers 32 set in the second candidate table 42 are then used to reference the address pointers 35 in the facial part attribute table 31. From among the facial pattern data 36, the facial part patterns pointed to by the address pointer 35 are displayed one by one as a candidate in the portrait drawing area 82 (step 66 of FIG. 6).

The operator determines if the currently displayed facial part candidate in the portrait drawing area 82 best represents the model's characteristic regarding the facial part in question, and operates the keyboard 22 to input the decision (step 67). If the currently displayed candidate is selected (YES in step 67), control is returned from the facial part determining routine to step 54; if the currently displayed candidate is not selected (NO in step 67), a check is made to see if the current pattern number 32 in the second candidate table 42 is the last number (step 68). If the pattern number 32 is not the last number (NO in step 68), step 66 is reached again in which the facial pattern corresponding to the next pattern number 32 in the second candidate table 42 is displayed as another candidate in the portrait drawing area 82 (step 66).

The process of determining the facial part (steps 66 through 68) continues until the appropriate facial part candidate is selected (YES in step 67) or until the pattern numbers 32 stored in the second candidate cable 42 have been exhausted (YES in step 68). When the last pattern number 32 in the second candidate table 42 is displayed as a candidate (YES in step 68), step 63 is reached again. In this step, the facial patterns corresponding to the pattern numbers 32 in the first candidate table 41 are again displayed one by one as a candidate in the portrait drawing area 82 (step 63). Steps 63 and 68 are repeated until the appropriate facial part is selected (YES in steps 64 or 67).

As described, the facial part candidate tables prepared in steps 61 and 62 present the operator preferentially with those facial part patterns between representing the model's characteristic than other patterns (steps 63 through 65). The scheme allows the operator to find the appropriate facial part pattern in the shortest possible time and thereby to draw the portrait with ease.

As described, the portrait drawing apparatus according to the invention allows the operator to designate facial part attributes with which to display preferentially more likely candidates of the facial part in question. From these candidates displayed, the operator can select the best candidate of each facial part easily and quickly. Thus the portrait is drawn with ease and in the shortest possible time.

While a preferred embodiment of the invention has been described using specific terms, such description is for illustrative purposes only, and it is to be understood that changes and variations may be made without departing from the spirit or scope of the following claim.

What is claimed is:

1. A portrait drawing apparatus comprising:
   image display means for displaying portrait image data;
   storage means for storing pattern data on a plurality of facial parts;
   attribute storage means for storing information on attributes corresponding to the pattern data for each of the plurality of facial parts;
   input means for inputting attribute information as a condition under which to search for a facial part pattern;
   searching means for searching and retrieving appropriate facial part patterns based on attribute information derived from said attribute storage means; and
   display control means for sequentially displaying on said image display means facial part patterns of at least one facial part such that the facial part patterns searched and retrieved by said searching means contain the attribute information entered by said input means before displaying the remainder of said facial part patterns of said at least one facial part.

2. The portrait drawing apparatus as claimed in claim 1, further comprising designation means for designating a displayed facial part pattern to be incorporated into a finished portrait image.

3. The portrait drawing apparatus, as claimed in claim 2, wherein said display control means initially displays one at a time facial part patterns identified by said searching means to contain the attribute information input through said input means.

4. The portrait drawing apparatus as claimed in claim 3, wherein the display control means displays facial part patterns that do not contain the attribute information input by said input means when a facial part pattern having the input attribute information has not been designated using said designation means.

5. A portrait drawing apparatus, comprising:
   image display means for displaying portrait image data;
   storage means for storing base pattern data corresponding to a plurality of facial parts;
   base pattern category input means for inputting base pattern category data for indicating a category of a desired portrait image;
   base pattern search means for searching the base pattern data for the desired portrait image, said base pattern search means searching the base pattern data included in the category input by the base pattern category input means prior to searching base pattern data excluded from the category; and
   display control means for sequentially displaying on said image display means the base pattern data searched by said base pattern search means such that base pattern data included in the category is displayed before base pattern data excluded from the category.

6. The portrait drawing apparatus, as claimed in claim 5, wherein said base pattern search means includes means for continuously searching the base pattern data excluded from the category input by said base pattern category input means after searching all base pattern data included in the category.

7. The portrait drawing apparatus as claimed in claim 5, wherein said base pattern search means searches the base pattern data for the desired portrait image for a single facial part at a time.

8. The portrait drawing apparatus as claimed in claim 7, further comprising designation means for designating a displayed base pattern data to be incorporated into a finished portrait image.

9. The portrait drawing apparatus, as claimed in claim 8, wherein said base pattern category input means further comprises input means for inputting attribute information wherein said display control means initially displays base pattern data identified by said base pattern search means to contain the attribute information input through said input means.

10. The portrait drawing apparatus as claimed in claim 9, wherein the display control means displays facial part patterns that do not contain the attribute information input by said input means when a base pattern data having such attribute information has not been designated using said designation means.

11. A method of creating a portrait on a display apparatus, comprising the steps of:
    designating a facial part;
    inputting base pattern category data of a desired portrait image;
    reviewing a data base containing multiple representations of facial parts for representations having the input base pattern category data of the desired portrait image;
    discriminating the representations of the facial parts included in the desired base pattern category data from the remainder of the representations of the facial parts that are not included in the desired base pattern category data;
    displaying on the display means at an appropriate location for the facial part on the portrait the representations of the facial parts included in the desired base pattern category one at a time;
    designating one of the representations of the facial parts included in the desired base pattern category when one of the representations of the facial parts is appropriate; and
    displaying the representations of the facial parts that are not included in the desired base pattern category when none of the representations of the facial parts included in the desired base pattern category are designated.

12. The method as claimed in claim 11, further comprising the steps of:
    designating one of the representations of the facial parts that are not included in the desired base pattern category when presented on the display means.

13. The method as claimed in claim 12, further comprising the step of designating another facial part.

14. The method as claimed in claim 13, wherein said steps of inputting desired base pattern category through designating one of the representations of the facial parts that are not included in the desired base pattern category are repeated for each defined facial part in order to complete a portrait.

* * * * *